Patented June 21, 1938

2,120,968

UNITED STATES PATENT OFFICE 2,120,968

PRODUCTION OF DIARYL AMINES

Marshall Francis Acken, Woodbury, N. J., assignor to E. I. du Pont de Nemours & Company, Wilmington, Del., a corporation of Delaware No Drawing. Application May 15, 1935, Serial No. 21,677. Renewed November 4, 1937

11 Claims. (Cl. 260—128)

The present invention relates to a new and improved process for the production of diaryl amines from the corresponding primary aryl amines, and more particularly to a process for the production of diphenylamine from aniline utilizing a more efficient catalyst.

Diaryl amines generally, and diphenylamine in particular, are usually produced by heating primary aromatic amines under pressure in the presence of a catalyst. During the course of the reaction, ammonia is given off and the diaryl amine is produced.

The catalysts which have heretofore been employed for this type of reaction have commonly been halogen compounds of various types. Thus Rogers (in U. S. Patent 1,314,538) discloses the use of bromine compounds such as ammonium bromide; Houlehan (in U. S. Patent 1,392,942) discloses iodine compounds such as ammonium iodide; Tanberg (in U. S. Patent 1,422,494) discloses chlorine compounds such as ammonium chloride, while Frei (in U. S. Patents 1,840,576 and 1,921,076) uses hydro-halides generally, such as hydrogen chloride. Besides these halogen compounds, benzene sulfonic acid (U. S. Patent 1,549,136) and sulfanilic acid (U. S. Patent 1,840,576) have also been employed.

The halogen catalysts have been generally satisfactory, but they possess certain disadvantages. The initial rate of reaction brought about by these agents is generally low, thereby requiring a relatively long period of autoclaving in order to obtain satisfactory yields. Furthermore, many of the catalysts are insoluble in cold primary aromatic amines. In addition, some of the agents are not readily available. Finally, in many of the cases, the catalyst has a tendency to remove itself from the zone of reaction and to collect in the upper part of the reaction chamber, especially in corrosion-resistant equipment. In other types of equipment, on the other hand, the catalyst may be partly destroyed by entering into a reaction with the metal of the autoclave.

The object of the present invention is a new and improved process for the production of diaryl amines from the corresponding primary aryl amines. A further object is a more efficient catalyst for the production of diaryl amines, which induces a rapid rate of reaction. Another object is a catalyst which is soluble in primary aromatic amines, thereby permitting a homogeneous reaction. A still further object is an improved process for producing diphenylamine from aniline. Other object will be apparent as the invention is hereinafter described.

I have found that these objects are accomplished by employing, as a catalyst in the production of diaryl amines, a metal halide in conjunction with a substance which produces a hydrohalide upon thermal decomposition. Preferably, the substance producing the hydrohalide and the metal halide are used in substantially equivalent or equimolar proportions with respect to one another.

As a result of the use of the metal halide, the substance which produces the hydrohalide upon thermal decomposition appears to be prevented from subliming or otherwise removing itself from the zone of the reaction. As a consequence, the catalytic effect is substantially constant during the entire course of the reaction, since the catalyst is apparently retained in the zone of the reaction during the entire period thereof. The exact explanation of the superior catalytic effect of the substances within the purview of this patent is, however, not definitely known, nor is it material to the description of the invention.

The halides of various metals are applicable in accordance with my invention. Thus, for example, I may employ the halides of iron, cobalt, nickel, chromium, manganese, zinc, tin, antimony, lithium, cadmium, magnesium, and the like, in a manner similar to that hereinafter described. A wide choice may also be made of the substances which produce a hydrohalide on thermal decomposition. The hydrochlorides, hydrobromides, and hydroiodides of ammonia, aliphatic amines, aromatic amines, and hydrazines, and other types of compounds, such as trichloracetic acid, haloamines, acid halides, and other substances which readily decompose to form a hydrohalide are all applicable. Because of their cheapness, however, I prefer to employ the ammonium halides and the aniline hydrohalides.

In order to describe my invention more clearly, I shall cite a number of specific examples of preferred embodiments thereof. This is done solely by way of illustration, and is therefore, not to be construed as a limitation upon the scope of my invention, which has many important embodiments beside those specifically cited hereinafter.

Example I

One mol. of ferrous chloride and two mols of ammonium bromide were dissolved in water and the solution was evaporated to dryness. Five parts of the resulting product were heated in a glass-lined autoclave at 310 to 340° C. with two hundred parts of aniline. In twenty hours a yield of 74.4% diphenylamine was obtained.

Similar results were obtained with a catalyst of the approximate formula $FeCl_2—1NH_4Cl$. In two hours the yields were approximately 37%.

Example II

One mol. of aniline hydrochloride and one mol. of ferrous chloride hydrate were ground together and thoroughly mixed.

Sixteen parts of the resulting material were heated, as in Example I, with two hundred and sixty parts of aniline. At the end of two hours' heating, a yield of 40% diphenylamine was obtained. The catalyst was soluble in aniline.

A similar aniline-soluble catalyst is obtained from equimolar proportions of a ferrous halide such as ferrous chloride, ferrous bromide, and the like; and other amine hydrohalides, as, for example, aromatic amine hydrohalides such as toluidine hydroiodide, anisidine hydrobromide, phenetidine hydrochloride, and the like; or aliphatic amine hydrohalides such as triethyl amine hydrochloride, dibutyl amine hydrobromide and hexyl amine hydroiodide. These materials are not only soluble in the primary amine, which it is desired to convert to the diaryl amine, but also produce a rapid initial rate of reaction.

Example III

Approximately five parts of a catalyst comprising cobalt chloride and ammonium chloride in equivalent proportions were heated, as in Example I, with two hundred parts of aniline for twenty hours. The yield was 48.5%.

Similar results are obtained using other halides of cobalt with other substances which produce a hydrohalide upon thermal decomposition.

Example IV

Approximately six parts of a catalyst comprising equivalent amounts of stannous chloride and ammonium chloride were employed as in Example I. After twenty hours' heating, a yield of 39.3% was obtained. Other halides of tin may also be employed with other hydrohalide-producing substances.

Example V

Five parts of a catalyst comprising equivalent amounts of cadmium chloride and ammonium chloride were employed as in Example I. In twenty hours, a 40.3% yield was obtained. Similar catalysts comprising cadmium halides and other hydrohalide-producing substances are also effective.

Example VI

Approximately six parts of a catalyst consisting of cuprous chloride and ammonium chloride were heated with two hundred parts of aniline for twenty hours. The yield was 29.7%.

Example VII

Using approximately five parts of $ZnCl_2—2NH_4Cl$, as in Example I, a yield of 27.8% was obtained in twenty hours. Manganese chloride-ammonium chloride employed in the same manner gave 26.6% yield in twenty hours.

Under conditions substantially the same as those obtaining in the above examples, two hundred parts of aniline were heated in the presence of five parts of ammonium chloride. A yield of only 16% was obtained after twenty hours' heating. The superiority of the catalysts according to my invention is therefore readily apparent.

The above examples of the production of diphenyl amine are cited so that the relative efficiencies of the various catalysts can be compared more readily. As evidenced by the yields obtained in these examples, it is seen that my catalyst is greatly more effective than the catalyst heretofore most commonly employed. Thus the catalyst of Example I has a conversion factor approximately eight times as great as that of ammonium chloride under the same conditions.

While I have cited specific examples from the production of diphenylamine, the same catalysts may be employed in the production of diaryl amines generally. Thus, for example, diaryl amines may be produced, according to my process, from various primary amines such as anisidine, toluidines, xylidines, phenetidine, naphthylamines, and like compounds. The procedure is essentially the same, and the results, according to my invention, are superior to those heretofore obtained.

An important advantage in the use of my catalysts is the high initial rate of the reaction which is induced thereby. As is seen from Examples I and II, approximately 40% yields may be obtained in 2 hours. Moreover, the catalysts of Example II are soluble in aniline. With these catalysts, a continuous process for the production of diphenylamine is therefore feasible. Such a process is disclosed in my copending application, Serial No. 21,678, filed May 15, 1935.

In the foregoing detailed description of my invention, many variations may be made without departing from the spirit or scope thereof. I intend therefore to be limited only in accordance with the following patent claims.

I claim:

1. The process of producing diaryl amines from primary aromatic amines, which comprises heating at reaction temperature the primary aromatic amine in the presence of a metal halide and a substance which liberates a hydrogen halide upon decomposition under the heating conditions of the reaction.

2. The process of producing diaryl amines from primary aromatic amines, which comprises heating at reaction temperature the primary aromatic amine in the presence of a metal chloride and a substance which liberates a hydrogen halide upon decomposition under the heating conditions of the reaction.

3. The process of producing diaryl amines from primary aromatic amines, which comprises heating at reaction temperature the primary aromatic amine in the presence of ferrous chloride and a substance which liberates a hydrogen halide upon decomposition under the heating conditions of the reaction.

4. The process according to claim 3, in which the diaryl amine consists of diphenylamine and the primary aromatic amine is aniline.

5. The process of producing diaryl amines from primary aromatic amines, which comprises heating at reaction temperature the primary aromatic amine in the presence of ferrous chloride and a substance selected from the group consisting of hydrohalide salts of ammonia, amines, and hydrazines.

6. The process according to claim 5, in which the diaryl amine consists of diphenylamine and the primary aromatic amine is aniline.

7. The process of producing diphenylamine from aniline, which comprises heating at reaction temperature aniline in the presence of ferrous chloride and an ammonium halide, in about equivalent proportions.

8. The process according to claim 7, in which the ammonium halide is ammonium bromide.

9. The process according to claim 7, in which the ammonium halide is ammonium chloride.

10. The process of producing diphenylamine, which comprises heating at reaction temperature aniline in the presence of about equimolar proportions of ferrous chloride and aniline hydrohalide.

11. The process according to claim 10, in which the aniline hydrohalide is aniline hydrochloride.

MARSHALL FRANCIS ACKEN.